2,968,593
PREPARATION OF ANORGANIC BONE

Edward Rapkin, Evanston, Ill., assignor to Armour and Company, Chicago, Ill., a corporation of Illinois No Drawing. Filed Dec. 9, 1957, Ser. No. 701,355

3 Claims. (Cl. 167—74)

This invention is related to the preparation of anorganic bone. The invention is particularly related to a method for the preparation of anorganic bone of improved quality and purity.

The preparation of anorganic bone, that is, the inorganic matrix of bone resulting from the ethylenediamine extraction of bone tissue, was reported in "Science," vol. 119, p. 771, in 1954. The procedures there reported involve the extraction of organic material from bone by a constant boiling aqueous solution of ethylenediamine in a Soxhlet apparatus. By such procedures organic materials are removed from bone tissue without altering the inorganic structure of the bone. Since that early date other means of preparing anorganic bone have been tested, most notably the ethylene glycol-potassium hydroxide extraction procedures which were reported in the J. Dent. Research, vol. 14, p. 251 (1934). No procedure has been as successful as the ethylenediamine extraction method and recent comparative studies on these methods have been reported in NMRI Research Report 008–015.12.01.

The organic materials of bone, principally proteins, polysaccharides and fats, are very complex. Collagen is the principal protein in bone tissue and amounts to approximately 30% by weight of the total bone. The cementing substances of bone are believed to be mucopolysaccharides representing from about 1.24 to .4% by weight of the bone. Also included within bone tissue are many materials which are not actually part of the bone, such as blood and blood vessels, lymph and lymph capillaries, nerves, etc. These materials have organic components including lipids, proteins, citrates, enzymes, vitamins, saccharides, etc. Such organic material, particularly protein, accounts for the reaction often noted upon the transplantation of bone tissue from one species of animal to another species. It is most significant that upon the removal of the organic material from bone that the inorganic bone fraction remaining can be transplanted from an animal of one species to another species without obtaining an adverse effect. The porosity of the treated bone is known to facilitate the revascularization and revitalization of the graft.

I have noted that the anorganic bone produced by now conventional ethylenediamine extraction methods is extremely brittle and has little strength. During and after production of the bone by conventional procedures there is considerable sloughing off of the bone and a surprising amount of the material flakes off, generally in layers, from the surface of the anorganic bone. The characteristics of the surface of the bone pieces are considerably altered and can best be described as having an eroded appearance. The flakes, which often may amount to as much as 20% by weight of the product, are very undesirable since they interfere with normal extraction procedures by clogging the syphoning lines and the screens used to support the bone pieces. The flaking of the bone material is also undesirable in that it complicates the use of the bone in bone transplanting procedures. The flaking of the bone also diminishes the yield of usable anorganic bone obtainable from a given amount of fresh bone tissue.

I have also found that ethylenediamine reacts with fat particles of the bone to form diamides of the type 1,2-bis(stearamido)ethane which are insoluble in both aqueous ethylenediamine and in water and are also strongly adsorbed on the extracted bone. Such diamides tend to discolor the product and have not heretofore been eliminated by the known extraction procedures.

I have found that a physically stronger anorganic bone with no surface flaking and no evidence of adsorbed diamine can be produced by pretreatment of the bone prior to the ethylenediamine extraction. The pretreatment steps which comprise the present invention include heat-treating of the bone in liquid, e.g. as by heating in water at about boiling temperatures, and subsequent drying prior to conventional extraction procedures.

In the pretreatment step of this invention, temperatures greater than about 80° C. can be used though I prefer to use the boiling temperature of water for reasons of convenience and economy. Temperatures in excess of the boiling point of water under normal atmospheric conditions which are not detrimental to the bone can also be used by means of pressure equipment. For reasons of convenience and economy I prefer to use water as the liquid solvent in the pretreatment step though other liquids similar in effect on the organic components of bone may be used.

Boiling of the bone in several changes of water prior to extraction practically eliminates sloughing and flaking and gives a product of increased strength. The product can also be materially improved in color and purity (i.e. freedom from organic material) if an additional step, that of fat extraction, prior to ethylenediamine extraction is utilized.

I have found that, even though bone is boiled in several changes of water prior to ethylenediamine extraction, that not all of the fat is removed from the bone. Therefore, after the step of boiling, the bone material is preferably dried and extracted with any of the more commonly known fat solvents. The solvents of choice for the fat extraction step are the straight chain hydrocarbons ordinarily obtained as petroleum fractions or petroleum distillate mixtures having specific boiling point ranges. I have also successfully employed ethanol and similar alcohols as fat solvents in this process. Halogenated fat solvents such as chloroform, trichloroethylene and ethylene dichloride may also be used, but are considered less desirable than the first-mentioned solvents since they react with ethylenediamine to form undesirable polymeric substances; thus when halogenated fat solvents are used they must be completely removed from the bone prior to extraction of the bone with ethylenediamine.

It has also been found that drying after boiling is not necessary if ethylenediamine of greater strength than 80% is employed. However, the use of wet boiled bone makes it difficult to obtain known concentrations, and therefore it is preferred to dry the bone material after boiling and prior to fat removal.

The mechanism by which heat-treatment in liquid affects the bone is not completely understood. The increased strength of anorganic bone and the absence of surface erosion flaking are not explained. It might be argued that denatured protein, formed during boiling in water or equivalent processes, contributes to the strength of the bone and is not removed by extraction; however, this theory is incorrect since analysis shows that the product routinely analyzes less than .02% of nitrogen by weight and therefore is devoid of any organic matter.

It may also be that the inorganic matrix of bone, which appears to be formed in layers with a concentration of organic material between the layers, is broken up in conventional processes by the swelling of organic materials between the inorganic layers; thus, by heating the bone in a solvent for protein such as water, a portion of organic material may be removed without swelling and consequent flaking off of inorganic layers.

The invention is further illustrated by the following specific examples:

Example I

Bovine femur from freshly killed animals was collected. The femur heads were removed by sawing and shaft was sawed in two. The marrow was scraped from the marrow cavity and the cortical bone was sawed into "wedges" with an approximate length of 2″ and width of 1″. The thickness of each wedge was that naturally occurring in the bone.

About 3600 g. of bovine femur cortex wedges were charged into a Soxhlet extractor and extracted for 48 hours with an 80% ethylenediamine–20% water mixture. The body of the extractor was externally heated and extraction temperature was maintained in the temperature range of 80°–110° C. The extractant boil-up rate was maintained such that one complete solvent change occurred each hour.

During extraction, it soon became evident that considerable flaking and erosion of the bone was taking place. Pieces of bone split off in rather large sheets and small particles resulted from the breakup of these sheets. Considerable difficulty was encountered in maintaining smooth syphoning action of the extractor due to clogging of the syphon line.

After completion of the ethylenediamine extraction the now protein-free bone was washed with a considerable volume of distilled water to remove superficial ethylenediamine. The interstitial ethylenediamine was removed by Soxhlet extraction with distilled water. Four days of continuous water extraction with two changes of water in the boiler per day were required to completely remove all ethylenediamine from the bone. In addition to the frequent changes of extracting water, phosphoric acid was added to the boiler to keep down the volatile already extracted ethylenediamine.

When all alkalinity had been extracted, the anorganic bone was removed from the extractor and dried for 48 hours at 60° C. The weight on anorganic bone wedges recovered was 2048 g. while 390 g. of flakes and chips were also obtained.

Example II

Bovine femur heads were boiled for a total of about 24 hours in three changes of water. The boiled bone, free of all appended fat, tissue and cartilage, was dried to a low residual moisture content. The dried, boiled heads were then sawed into convenient sized pieces (approximately ¾″ x 2″ x 2″).

Boiled, dried pieces of cancellous bone from bovine femur head (2430 g.) were placed in a Soxhlet extractor and extracted with aqueous ethylenediamine as described in Example I. During such ethylenediamine extraction no flaking, spalling or splitting was noted.

At the completion of ethylenediamine extraction, the residual ethylenediamine was removed by water extraction in the same manner as described in Example I. However, ethylenediamine is removed more readily from the spongy cancellous bone than from dense cortical bone. Therefore, water extraction required only three days. The completely extracted cancellous bone was removed from the extractor and dried at 100° C. for 24 hours. The yield was 1100 g.

Examination of the dried bone showed it to have a decided yellow color with inclusions of a waxy yellow substance in many of the interstitial cavities. This impurity could not be removed by extraction with any of the more usual solvents, including hydrocarbons, alcohols, halogenated solvents, esters and ketones. The material was chemically identified as 1,2-bis(stearamido)ethane.

Example III

Bovine femur shaft was sawed into wedges as described in Example I. The wedges were boiled for a 24 hour period in two changes of water. The boiled wedges were dried at 100° C. and then 3195 g. of such dried material was placed in the Soxhlet extractor.

The boiled dried femur cortex wedges were defatted by extracting for a 24 hour period with a hydrocarbon fat solvent, a petroleum fraction consisting principally of n-heptane having a boiling point range of from about 190 to 208° F. The boil-up rate was maintained such that two complete solvent changes occurred each hour. The extractor was maintained at about 50° C. during fat removal. Analysis showed that the fat content of solvent defatted bone was less than 0.01%.

Organic matter was removed from boiled defatted bone by replacing the fat solvent with aqueous ethylenediamine and operating as described in Example I above. No splitting or flaking was noted. Residual ethylenediamine was removed from extracted bone with water, also as described in Example I. The anorganic bone was removed from the extractor and dried.

The yield of anorganic bone wedges was 2363 g. There was no measurable quantity of chips. The bone was white and there was no evidence of 1,2-bis(stearamido)ethane formation as evidenced by chemical and physical determinations. The nitrogen content of the product was less than 0.01%.

Example IV

Bovine upper arm bone heads were boiled, dried, and sawed as described for femur heads in Example II. 2120 g. of such cancellous bone was placed in the Soxhlet extractor and defatted with a fat solvent as described in Example III. The boiled, dried, defatted cancellous bone was then extracted with ethylenediamine to remove organic matter as described in Example I. When the fat extract solvent is replaced by ethylenediamine, it is necessary to remove all residual traces such as hydrocarbon material since, due to its low boiling point, said residual material would limit operating temperatures. Fortunately removal of fat extracting solvent is facilitated by its insolubility in aqueous ethylenediamine.

After completion of ethylenediamine extraction, residual ethylenediamine was removed by three days of water extraction as previously described. The wet anorganic bone was removed from the extractor and dried at room temperature in a vacuum oven. The yield of dried material was 1024 g. with a nitrogen content of 0.009%.

There was no evidence of splitting or flaking of the formation of 1,2-bis(stearamido)ethane.

Example V

Ovine femurs with one head removed which had been collected and stored for several weeks without refrigeration were received for processing in a badly putrified condition. These bones were covered with water and boiled for a total of 24 hours using three changes of water. The boiled bones were dried, the remaining heads were removed by sawing, and were discarded. The femur shaft was cut into cylinders with an approximate diameter of ½″ and length of 1″.

The Soxhlet extractor was loaded with 2457 g. of ovine femur shaft cylinders and the bone was defatted by a 24 hour extraction with petroleum solvent consisting primarily of n-hexane and having a boiling point range of from about 146–157° F. The petroleum solvent was removed and the boiled, dried, defatted bones were extracted for two days with aqueous ethylenediamine as previously described. The ethylenediamine was then removed by the usual water extraction procedure over a four day period. The cylinders were removed and dried. The yield was 1784 g.

Although the shaft of a sheep femur is made up of thin cortical bone (approximately 1/16"–1/8" in thickness) there was no splitting or flaking during processing and drying. The product was dead-white in appearance and had a nitrogen content of 0.01% N. No evidence of the presence of residues of reaction products between ethylenediamine and fat could be found on the surface of the anorganic bone or in its interior. The fact that the bone was putrified prior to processing did not appear to affect either the subsequent operations or the quality of the product.

*Example VI*

Porcine femurs were obtained from boning smoked hams. The femur heads were removed by sawing and boiled for a 234 hour period in two changes of water. The boiled femur heads were dried and sawed into pieces of convenient size.

The Soxhlet extractor was charged with 2410 g. of boiled, dried porcine femur heads which were defatted over a 24 hour period with chloroform. Since previous experience had indicated that residual chloroform, as well as other chlorinated solvents, reacted with ethylenediamine to form dark, polymeric substances which discolored the final product, it was necessary to completely eliminate residual amounts of such undesirable material. The porcine bone was therefore removed from the extractor and chloroform was eliminated in vacuo. The solvent-free porcine femur heads were re-charged to the Soxhlet.

Organic matter was removed by two days of aqueous ethylenediamine extraction and the ethylenediamine was removed by three days of water extraction. The extracted bone was removed from the Soxhlet and dried. The yield was 877 g.

Analysis showed a nitrogen content of less than 0.01%. There was no evidence of splitting or flaking nor of the formation of reaction products between ethylenediamine and fat.

The invention described above is, of course, susceptible of many variations and modifications, all of which are within the skill of the art. It should be understood that all of such variations and modifications are within the spirt and scope of the invention and of the appended claims.

I claim:

1. The method of preparing anorganic bone comprising the steps of heating bone in a liquid to a temperature from about 80° C. to about 100° C., drying the bone, substantially defatting the bone with a fat extracting solvent, and removing the organic matrix from the defatted bone to obtain the inorganic matrix.

2. The method of preparing anorganic bone comprising the steps of boiling bone in successive changes of water, drying the bone, substantially defatting the bone with a fat extracting solvent, and removing the organic matrix from the defatted bone to obtain the inorganic matrix.

3. The method of preparing anorganic bone comprising the steps of boiling bone in successive changes of water, drying the bone, substantially defatting the bone with a fat extracting solvent, and removing by extracting with ethylenediamine the organic matrix from the defatted bone to obtain the inorganic matrix.

References Cited in the file of this patent

Ray et al.: J. Bone and Joint Surgery, vol. 39A, No. 5, October 1957, pp. 1119–1128.

Lloyd-Roberts: J. Bone and Joint Surgery, vol. 34B, No. 3, August 1952, pp. 428–432.

Williams et al.: Science, vol. 119, March 28, 1954, pp. 771–772.

Orell: Jour. of Bone and Joint Surgery, vol. 19, No. 4, October 1937, pp. 873–885.